(12) United States Patent
Pellenc et al.

(10) Patent No.: US 10,263,464 B2
(45) Date of Patent: Apr. 16, 2019

(54) SYSTEM AND METHOD FOR COMMUNICATING BIDIRECTIONALLY AND SIMULTANEOUSLY

(71) Applicant: PELLENC (Societe Anonyme), Pertuis (FR)

(72) Inventors: Roger Pellenc, Pertuis (FR); Bernard Lopez, La Tour d'Aigues (FR)

(73) Assignee: PELLENC (Societe Anonyme), Pertuis (FR)

( * ) Notice: Subject to any disclaimer, the term of this patent is extended or adjusted under 35 U.S.C. 154(b) by 236 days.

(21) Appl. No.: 15/512,643

(22) PCT Filed: Nov. 3, 2015

(86) PCT No.: PCT/FR2015/052965
§ 371 (c)(1),
(2) Date: Mar. 20, 2017

(87) PCT Pub. No.: WO2016/079397
PCT Pub. Date: May 26, 2016

(65) Prior Publication Data
US 2017/0244280 A1    Aug. 24, 2017

(30) Foreign Application Priority Data
Nov. 19, 2014 (FR) .................... 14 61184

(51) Int. Cl.
*H02J 7/24* (2006.01)
*H04B 3/54* (2006.01)
(Continued)

(52) U.S. Cl.
CPC .......... *H02J 13/0024* (2013.01); *A01G 3/037* (2013.01); *H02J 7/245* (2013.01);
(Continued)

(58) Field of Classification Search
CPC ... H02J 7/245; H02J 13/0024; H04L 25/4902; H04L 27/04; Y04S 40/122; Y04S 40/146; Y02E 60/7823; H04B 3/542; A01G 3/037
See application file for complete search history.

(56) References Cited

U.S. PATENT DOCUMENTS

| 8,890,468 B2 * | 11/2014 | Bauer | H01R 31/06 |
| | | | 320/107 |
| 2007/0108944 A1 * | 5/2007 | Pellenc | H02J 7/0013 |
| | | | 320/130 |

(Continued)

FOREIGN PATENT DOCUMENTS

| EP | 0783994 | * | 7/1997 | ............... H02J 7/14 |
| EP | 0783994 A1 | | 7/1997 | |

(Continued)

OTHER PUBLICATIONS

International Search Report for corresponding International Application No. PCT/FR2015/052965.

*Primary Examiner* — Jared Fureman
*Assistant Examiner* — Duc M Pham
(74) *Attorney, Agent, or Firm* — Egbert Law Offices, PLLC

(57) ABSTRACT

Method and system for communicating between a first piece of equipment and a second piece of equipment connected to the first piece of equipment via a single-conductor transmission line, wherein data (DATA1, DATA2) are transmitted from the first piece of equipment to the second piece of equipment by pulse width modulation of a transmission signal emitted on the transmission line, and wherein data are transmitted from the second piece of equipment to the first piece of equipment by amplitude modulation of said transmission signal.

16 Claims, 5 Drawing Sheets

(51) Int. Cl.
*A01G 3/037* (2006.01)
*H02J 13/00* (2006.01)
*H04L 25/49* (2006.01)
*H04L 27/04* (2006.01)
*H04L 27/12* (2006.01)

(52) U.S. Cl.
CPC .......... *H02J 13/0062* (2013.01); *H04B 3/542* (2013.01); *H04L 25/4902* (2013.01); *H04L 27/04* (2013.01); *H04L 27/12* (2013.01); *Y02E 60/7823* (2013.01); *Y02E 60/7892* (2013.01); *Y04S 40/122* (2013.01); *Y04S 40/146* (2013.01)

(56) References Cited

U.S. PATENT DOCUMENTS

| | | | | |
|---|---|---|---|---|
| 2008/0238609 | A1* | 10/2008 | Wiesner | G08B 13/1409 340/5.2 |
| 2012/0118595 | A1* | 5/2012 | Pellenc | B25F 3/00 173/46 |
| 2014/0000922 | A1* | 1/2014 | Pellenc | B25F 5/00 173/46 |

FOREIGN PATENT DOCUMENTS

| | | | |
|---|---|---|---|
| FR | 2033742 | A5 | 12/1970 |
| FR | 2862558 | A1 | 5/2005 |
| FR | 2940561 | A1 | 6/2010 |

* cited by examiner

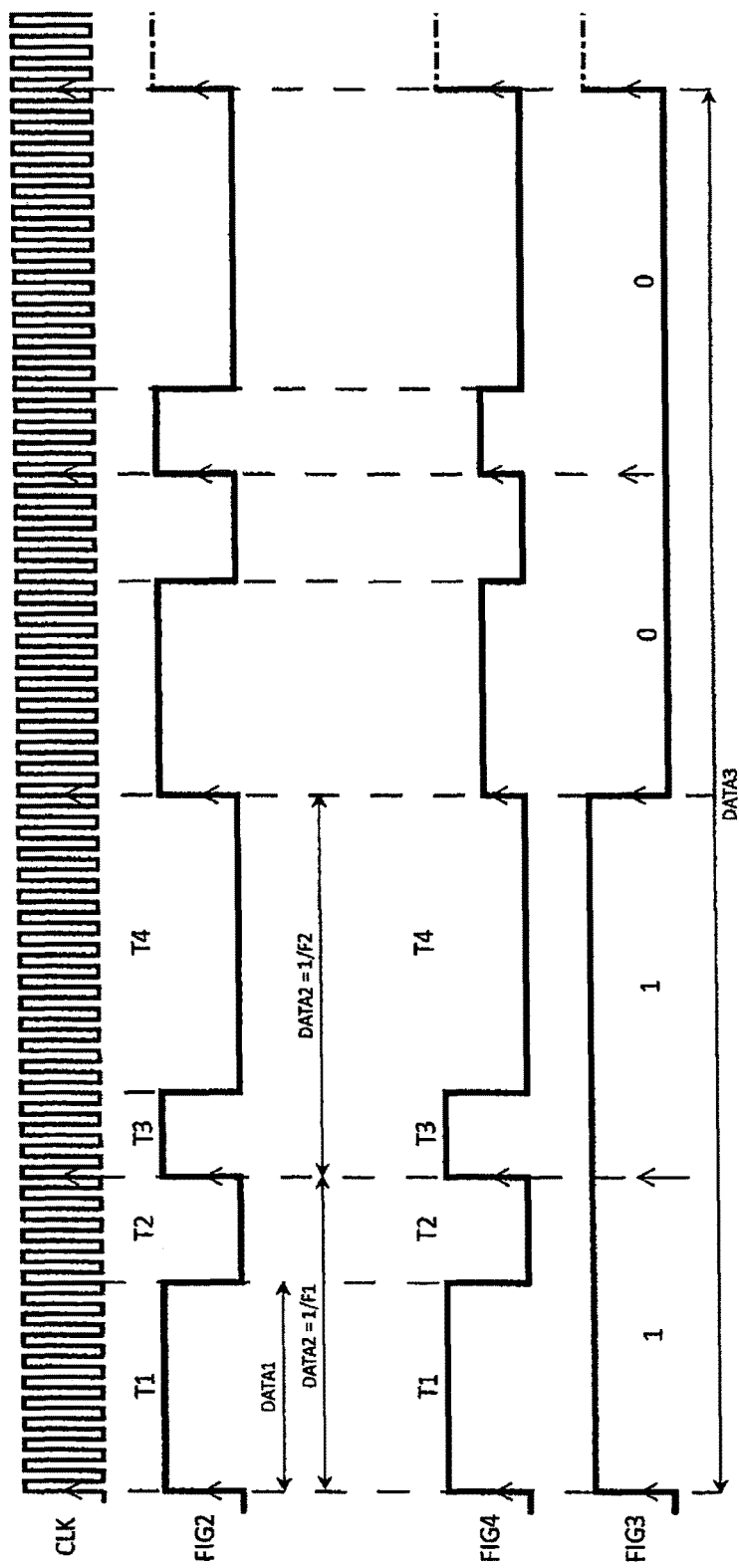

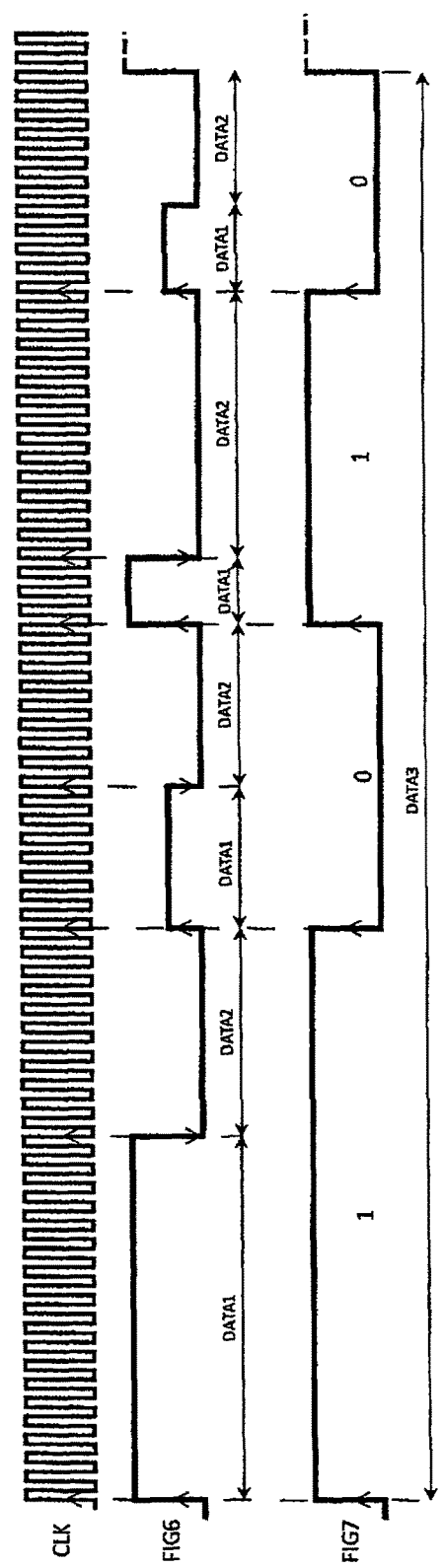

SYSTEM AND METHOD FOR COMMUNICATING BIDIRECTIONALLY AND SIMULTANEOUSLY

TECHNICAL FIELD

The present invention concerns a system and method for communicating bi-directionally and simultaneously through an exchange of signals between two pieces of equipment with a wire connection. The invention finds applications particularly for tools, especially portable, self-contained tools with electric motors provided with a remote power source, In this case the tool constitutes one piece of equipment and the power unit the other piece of equipment.

The invention may be applied to portable power tools in various fields of application, and in particular the fields of construction, maintenance of green spaces, viticulture, arboriculture and horticulture. The invention is particularly useful for professional tools equipped with strong electric and high-autonomy power supplies. A very special application of the invention concerns hand-held electric pruning shears with a remote power supply, for cutting and harvesting operations.

The invention also finds an application for versatile power supplies that are likely to be connected to different power tools.

STATE OF PRIOR ART

One is familiar with standardized bidirectional and simultaneous communication systems using electric connecting cables such as the telephone network, and systems used for data-processing or in industry such as RS 232, USB or ADC, Simultaneous communication of these different systems is transmitted via at least two wires of the electric connecting cable.

Although the invention may be applied in a general manner to any bi-directional and simultaneous communication system, the state of the art is described in reference to its main application in the field of power tools, where the communication requirements between the power tool and its energy source are growing steadily, and particularly for power tools with a remote energy source.

A remote energy supply is understood to mean an energy source that is located neither in the body of the tool nor in a housing directly connected to the tool. The remote energy source is connected to the tool by means of an electrical cable. Typically, tools with a remote energy supply have a power supply that may be worn on the belt or on the back. The length of the cable may be variable but is adequate to connect the power supply to a hand-held tool.

One is familiar, through documents FR2862558 and FR2033742, with self-contained portable tools with a remote electric power supply.

An electric cable with several conducting wires connects the electric power supply to the tool. The cable contains electric wires to provide power to an electric motor of the tool. For example, there are three wires for supplying power to a three-phase electric motor. The cable may also feature electric wires for powering an electronic card or electronic components of the tool. Finally, the cable may feature one or several wires for the exchange of information between the tool and the power supply unit.

The tools, as well as the power supply units, may be provided with electronic cards for the management of tool functions, for the management of a user's commands, for the management of power usage, for mutual identification of the connected items of equipment, etc. For proper coordination of the functioning of the tool and the battery, these electronic cards feature communication interfaces for exchanging information between them, generally in the form of digital data.

As tooling evolves and is perfected, the volume of exchanged data tends to increase.

A limiting factor for the exchange of data relates to the number of wires or conductors available inside the cable. Now, the cable preferably contains a limited number of wires, so as to retain good flexibility and high reliability. Therefore, the number of wires that may be allocated to an exchange of signals is reduced. It may indeed involve a single wire. This single wire does however allow only for sequential and not simultaneous communication in the state of art.

A second difficulty exists in the need, at least for certain tools, to be able to transmit simultaneously information from the tool to the power supply and from the power supply to the tool. This may be particularly important for safety data that need to be transmitted on a priority basis.

Finally, one difficulty is related to the electromagnetic disturbance of the transmitted signals. Such a disturbance is a problem susceptible to be encountered whatever the area of application of the invention. However, this is a critical problem in the field of power tools due to the disturbance inherent in the commutation of the phases of the motor and more generally in its operation.

Several types of links may be considered for the communication of information on a single conductor wire, The analog link is the oldest one known for transmitting information in a simple manner, It may be especially robust and not very sensitive to electromagnetic disturbances but only in the case of low bandwidth, where the disturbances may easily be filtered without significantly altering the transmitted information. However, the analog link is unsuitable not only for the transmission of data with high bandwidth and presence of electromagnetic disturbances, but also for the simultaneous transmission from the tool to the power supply and vice versa.

A serial digital link, for example of the Universal Asynchronous Receiver Transmitter (UART) type is commonly used, for example in the area of personal computers for transmitting data bit by bit on a line of the serial port of the computer. It has the advantage, compared to analog communication, of being able to transmit several items of information of an independent nature, but nevertheless it does not allow for simultaneous bidirectional communication over a single conductor wire.

Another type of serial link known under the name of Pulse Width Modulation (PW) or Pulse Width Modulation (MU) adheres to the principle of generating a logical signal, at a fixed frequency, but its duty cycle is digitally controlled according to the analog value to be transmitted. It espouses the simplicity of the analog link, while being quite robust relative to electromagnetic disturbances in case of high bandwidth. However, it does not allow the precision of a digital series link of the UART type, on account of its very principle of operation. In similar fashion to the UART or analog link, the PWM link also does not allow simultaneous bi-directional communication over a single conductor wire.

DISCLOSURE OF THE INVENTION

The present invention proposes a system and a method for bi-directional communication which does not present the limitations cited above. In particular, the invention proposes a communication link with good immunity against electromagnetic disturbances, capable of transmitting significant volumes of data, and capable of simultaneously transmitting data between two pieces of equipment.

Finally, the invention proposes such a system that is adapted to the communication between a portable electric tool and a remote power unit associated to this tool. In particular, one aim is to propose a system that is adapted to communication on a data transmission line with a single conductor.

To achieve these aims, as well as others that appear in the description, the invention proposes a bi-directional communication system between a first piece of equipment and a second piece of equipment connected to the first piece of equipment by a single conductor transmission line, including means for data transmission from the first piece of equipment to the second piece of equipment by modulation of the pulse width of a transmission signal emitted on the transmission line, and means of data transmission from the second piece of equipment towards the first piece of equipment through amplitude modulation of said transmission signal in which the means of data transmission from the first piece of equipment towards the second piece of equipment feature a first modulator capable of generating the transmission signal modulated in pulse width, dependent on at least one first digital signal, the first modulator being located in the first piece of equipment. In accordance with the invention, the first modulator is capable of coding a first digital data by modulation of the width of either a High and a Low of the transmission signal, and of coding a second digital data by modulation of a period, respectively a frequency, of the transmission signal.

A single conductor transmission line is understood to be a transmission line in which a single conductor is used for a communication which may be simultaneous and bi-directional between the first and the second piece of equipment, and in which the single conductor is sufficient for this bi-directional communication. However, this does not prejudice the existence or not of other conductors or electric wires between the first and the second piece of equipment. In particular, a communication system with several transmission lines is feasible.

Thanks to the invention, bidirectional communication may in effect be simultaneous on the same wire or the same conductor of the transmission line. Pulse width, signal frequency or period, are modulated for the transmission of data from the first piece of equipment towards the second piece of equipment. Now, at the same time, the signal may be amplitude-modulated for the transmission of data from the second piece of equipment to the first piece of equipment.

Communication of the communication system of the invention is akin to a connection of the PWM type for the transfer of data from the first piece of equipment towards the second piece of equipment; it is akin to a link of the UART type for the transfer of data from the second piece of equipment towards the first piece of equipment.

Data transmission from the first piece of equipment towards the second piece of equipment is not dependent on the existence of data transmitted from the second piece of equipment towards the first piece of equipment. In effect, and in the absence of data transmitted from the second piece of equipment towards the first piece of equipment, the transmission signal is simply not amplitude-modulated.

In a similar manner, and although the second piece of equipment uses a transmission signal to modulate its amplitude, the data transmission from the second piece of equipment towards the first piece of equipment is not dependent on the transmission of data from the first piece of equipment to the second piece of equipment. In effect, the first piece of equipment may be configured to produce a non-modulated transmission signal in the absence of data to be transmitted. It concerns, for example, a fixed signal where the width of the successive Highs and Lows is constant. This signal is then used for amplitude modulation and for synchronization of the communication from the second piece of equipment towards the first piece of equipment.

As indicated above, the means of data transmission from the first piece of equipment towards the second piece of equipment comprises a first modulator capable of generating the transmission signal that has been pulse-width modulated based on at least one first digital data, the first modulator being located in the first piece of equipment. The means of transmission also comprises a first demodulator capable of extracting said digital data from the transmission signal, the demodulator being located in the second piece of equipment.

Advantageously the first modulator may be designed to simultaneously code two items of information on the transmission signal. For example, the first modulator may be designed to code the first digital data on a High of the pulse of the transmission signal and to code a second digital data on the Low of the pulses of the transmission signal. In this case, the duration of the High and the duration of the Low may correspond to the first and the second data.

Incidentally, the first modulator is designed for coding a first digital data for either a High or a Low of the transmission signal, and for coding the second digital data for a period, respectively for a modulation frequency of the transmission signal. In other words, the duration of the period, or the value of the modulation frequency may be correlated to values of data to be transmitted. For example, a first value of the period of modulation, or of the frequency, may correspond to data reflecting a first state. and a second value of the period of modulation, or of frequency, may correspond to data reflecting a second state.

It is appropriate to note that coding of data on the modulation period amounts to the same thing as coding of data on the modulation frequency of the transmission signal. To several different modulation frequencies may correspond either several different data to be transmitted, or several values of the same data.

Modulation period of the transmission signal is to be understood as the duration of a half cycle formed by a consecutive High and Low of the signal. The modulation frequency is the inverse of the modulation period.

Incidentally, the terms "first datum" and "second datum" intend to distinguish different exchanged data but do not mean that the data is unique. It is understood that the modulators transmit numerous data. The first and the second data may thus be understood as data flows.

The means of data transmission from the second piece of equipment towards the first piece of equipment may feature a second modulator capable of modifying the amplitude of the transmission signal depending on a third digital datum. The second modulator is located in the second piece of equipment. In this case, a second demodulator is provided to extract the third digital datum from the transmission signal, the second demodulator being located in the first piece of equipment.

Like the terms "first datum" and "second datum" the term "third datum" does not necessarily designate a single item of data but rather a flow of data.

In a particular implementation of the second modulator, it may feature a load resistor in series with a control switch, for example a transistor, synchronized with the first and second data signals and controlled by the third digital datum. The load resistor is connected to the transmission line in order to modify its load. Depending on whether the switch is closed or open, the load resistance is connected or not to a reference voltage, for example a ground voltage. When it is connected to the reference voltage, i.e. when the switch is closed, the load resistance is in series with a resistance of the transmission line. It forms, together with this series resistance a dividing bridge which attenuates the transmission signal. When the switch is open, the load resistance is floating and does not attenuate the transmission signal.

Preferably, the frequency of the transmission signal from the first piece of equipment towards the second piece of equipment, which may be variable, is higher or equal to a modulation frequency of its amplitude.

Incidentally, the amplitude modulation of the transmission signal may be synchronized with the transmission signal. In particular, it may be synchronized with rising or falling edges of the transmission signal.

In order to increase the immunity of the communication system against electromagnetic disturbances, it may feature a low-pass filter connected to the transmission line. The filter cut-off frequency is preferably adjusted to be superior to the frequency of the transmission signal, and inferior to a target frequency for electromagnetic disturbances to be eliminated.

In a particular application of the invention, in the field of tooling, the first piece of equipment may be either an electric power tool or a remote power supply associated to the tool. In this case, the second piece of equipment is the other of either the power tool or the remote power supply associated to the tool.

The commands going from the tool towards the power unit generally have priority and are rapid commands to the extent that they concern the operation of the tool or safety functions. In the opposite direction, the commands from the power unit towards the tool are generally of lower priority or slower. It is therefore preferable to reserve communication by pulse width modulation for the transfer of data from the tool to the power unit and to reserve communication by amplitude modulation for the transfer of data from the power unit to the tool.

In a particular application of the invention the first piece of equipment may preferably be a portable power tool selected among a pruning shear, scissors, chain saw, hedgetrimmer, leaf blower and a brush-cutter. The second piece of equipment is then a remote electric power unit connected to the tool via a multi-conductor cable. The cable includes in particular a single conductor constituting the transmission line. The power unit may be specific for a given tool or may be adapted for various tools.

In a particular configuration, the tool may present a first control interface connected to the first modulator. to transmit command data from the tool towards the power supply unit. The first interface includes for example a trigger or a handle. The power supply unit may feature an electronic card for controlling, for example, a current for providing power depending on the control data, other parameters such as temperature, or any information for the user via a display or a warning sound such as the operating configuration of the tool. For this purpose, the electronic card is connected to the first demodulator to receive the control data of the tool. In the particular case where the tool is an electric pruning shear, the electronic card is also linked to the motor by the multi-conductor cable in order to provide the motor with a corresponding supply current.

In such a configuration, the cable includes, for example, the signal transmission line, two wires for supplying power to the first control interface, and wires for supplying power to the motor. In the case of a three-phase motor, there will be three power supply wires.

Just like the tool, the power supply may be provided with a control interface. The tool and the power supply may also be provided with a signaling interface. The signaling interface may feature a visual display or a sound signal.

Thus, the communication system may also be used to transmit signaling data or condition data sent to the signaling interfaces. The communication system may transmit, for example, data reflecting a load condition of the power supply unit or of the tool, a wear condition or maintenance information about the tool, a tool operating mode, a blockage situation of a cutting element, or a safety shutdown of the tool.

Typically, in an application of the invention for the communication between a pruning shear and a power supply unit of the pruning shear, the first interface, for example a trigger, may be configured for the input of at least either a command of movement amplitude of a mobile blade or a movement direction of the blade. The second interface of the power supply unit may be configured for the entry of at least either a command of Power ON for the pruning shear or a command for changing the operating mode.

The change of the operating mode may concern in particular the movement of the blade. It may especially mean a proportional movement or a movement for sudden shutdown of the blade. The operating mode may also determine the choice of an instruction for maximum opening of the blades, i.e. maximum pivoting amplitude of a mobile blade in relation to a fixed blade.

The invention also concerns a method of communication between a first piece of equipment and a second piece of equipment connected to the first piece of equipment by a single conductor transmission line. According to the method, data from the first piece of equipment towards the second piece of equipment are transmitted by pulse-width modulation of a transmission signal emitted over the transmission line and by frequency modulation of the transmission signal. Data from the second piece of equipment towards the first piece of equipment are also transmitted by amplitude modulation of said transmission signal.

Transmission of data from the second piece of equipment towards the first piece of equipment is possible simultaneously with the transmission of data from the first piece of equipment towards the second piece of equipment.

Frequency modulation of the signal transmission is equal to modulating h signal period, the period being formed by a High and a Low of the pulses.

Other characteristics and advantages of the invention will become clear from the description below with reference to the figures of the drawings. This description is given only for illustrative purposes and is not limiting.

BRIEF DESCRIPTION OF THE FIGURES

FIG. 2 is a graphic representation of an example of a transmission signal produced by a modulator of the communication system of FIG. 1.

FIG. 3 is a graphic representation of a digital signal corresponding to third datum to be transmitted.

FIG. 4 shows an example of amplitude modulation of the transmission signal of FIG. 2 as a function of the signal of FIG. 3.

FIG. 6 is a schematic representation of a signal produced by a modulator of the communication system of FIG. 5.

FIG. 7 is a graphic representation of a digital signal corresponding to data to be transmitted and used to modulate the signal of FIG. 6.

DETAILED DESCRIPTION OF THE MODES OF IMPLEMENTATION OF THE INVENTION

In the following description, identical or similar parts of the various figures are marked with the same reference signs.

Figure 1:
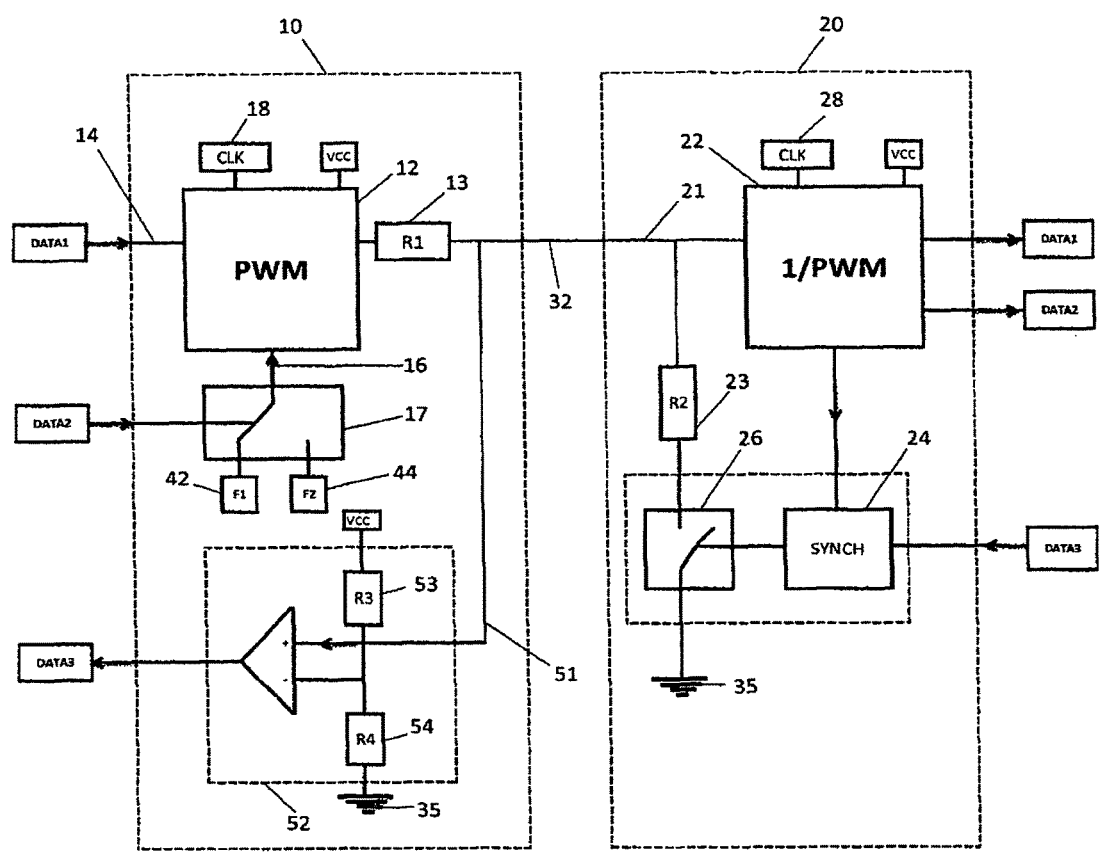
FIG. 1 is a schematic representation of a bi-directional communication system between two pieces of equipment, in conformance with the invention.

The communication system of FIG. 1 includes a first piece of equipment 10 and a second piece of equipment 20 which are connected by a multi-conductor cable. The cable includes a conducting wire 32 which constitutes a signal transmission line. The cable may also feature electric power wires 34, 35 for electronic cards of the first and second pieces of equipment 10, 20. These supply wires are not shown in detail on FIG. 1. References 34 and 35 simply indicate terminals for direct current voltage VDC, for example 5 Volt and a reference voltage (ground), for example 0 Volt. Each piece of equipment features a modulator and a demodulator.

The first piece of equipment 10 includes a first modulator 12 whose output is connected to the signal transmission line 32. In the example of FIG. 1 the first modulator is connected to the transmission line through the intermediary of a series resistance 13. The transmission line 32 is also connected to a first demodulator 22 of the second piece of equipment 20.

The first modulator 12 presents two inputs for data to be transmitted. A first input 14 receives a first datum to transmit. In the example shown, the first datum is a digital DATA1 corresponding to a motor speed set-point. The value of the set-point ranges for example from 1 to 700.

The modulator converts this data into a transmission signal corresponding to the representation of FIG. 2. FIG. 2 indicates on the y-axis the signal amplitude as a function of time. Time is indicated in x-coordinate. FIG. 2 shows that the signal presents a half cycle with a first High T1, its width, i.e. its duration, corresponds to the speed instruction. More exactly, the width of the High T1, and thus its duration, corresponds to the product of the speed instruction multiplied by a duration unit given by a timing clock 18. The pulses of the timing clock are indicated in the upper part of FIG. 2. Because of a great disparity between the timing frequency and that of the signal modulation, the timing clock pulses are shown on a free time-scale.

For example, for a clock set at a frequency of 1 MHz and a PW frequency of 1 kHz, a digital value DATA1 of 250 can be converted into a High T1 with a duration equal to 250 microseconds. The High is followed by a Low T2 which will then have a duration of 750 microseconds. If the Pulse Width modulation frequency is 1.1 kHz, the duration of the High T1 which corresponds to the DATA1 datum is still 250 microseconds. On the other hand, the duration of the Low T2 is in this case reduced to 659 microseconds. In effect, because of a higher frequency, the period formed by the succession of a High and a Low is shorter. It is in effect 1000 microseconds in the case of a PWM frequency of 1 kHz, and 909 microseconds in the case of a PWM frequency of 1.1 kHz.

By returning to FIG. 1, it can be seen that the first modulator 12 presents a second input 16 to which a second DATA2 datum is applied. In the example shown, this is a binary digital data which can only assume two values: 0 or 1. The DATA2 datum reflects, for example a rotational direction of the motor. In a particular application of the invention to an electric pruning shear, this command can correspond, for example, to an opening or closing movement of a mobile blade relative to a fixed blade.

The input 16 and thus the DATA2 instruction is applied to an electronic switch 17 which is suitable for connecting to the modulator an oscillator 42 delivering an oscillation frequency F1, for example of 1 kHz, or an oscillator 44 delivering an oscillation frequency F2, for example 1.1 kHz. It is appropriate to note that the oscillators 42 and 44 can be replaced by a single oscillator whose oscillation seta point is made to fluctuate, based on the DATA2 signal.

The first modulator 12 uses the instruction of one of the oscillators 42 and 44, based on the value of DATA2, to modify the frequency, or period, of the transmission signal.

As FIG. 2 shows, the period of the first half cycle including the High T1 and the Low T2 is 1/F1. This means that the first half cycle of the signal produced by the modulator is at the frequency F1. A second cycle includes a High T3, of different width from the High T1, and a Low T4. It presents in this example a frequency F2 and a period 1/F2. Thus, thanks to the first modulator, two items of information can be transmitted concomitantly from the first piece of equipment 10 towards the second piece of equipment 20. One item is coded on the width or duration of the Highs and the second one is coded on the frequency of the signal.

In the case of FIG. 2 a first speed instruction (T1) is transmitted for example for opening the blade (F1) and a second speed instruction (T3) is transmitted for the closing of the blade (F2).

One may note that several successive Highs can be transmitted at the same frequency, for example at frequency F1. In effect, the frequency F1 is maintained as long as the DATA2 signal is at one of its possible values, for example at value 1. It passes to F2 for its second value, 0 in this case. One may also note that it is possible to code the first item of information, or DATA1 datum, not on the width of the signal Highs but on the width or duration of the Lows. Finally, one may note that the switch 17 can be designed for selecting a frequency among a range of higher frequencies (greater than 2). This allows coding, in addition to the direction of movement of the blade, other information such as motor current limitation instructions, safety instructions etc. A wider range of frequencies also allows coding more complex DATA2 datum than just a binary data. It is possible, for example, to code the DATA2 datum on one byte. According to another possibility, it is also feasible to transmit a plurality of distinct data, each having a High value and respectively a Low value. This involves, for example, Stop and Go data, or ON or OFF data of an indicator light.

By returning to FIG. 1, one can observe that the transmission signal is received in an input 21 of the first demodulator 22. The first demodulator 22 is connected to a timing clock 28 of the second piece of equipment 20. The timing clock 28 of the second piece of equipment is not necessarily synchronized with the clock 8 of the first piece of equipment 10, but preferably presents the same timing frequency. The frequency of the second timing clock 28 is for example 1 MHz. The demodulator 22 can be designed to determine the width of the High or its duration, by counting the number of pulses of the second clock 28 during the High of the signal applied at its input 21. The beginning and the end of the count of clock pulses are given, for example by the rising edge and the falling edge of the pulse, The High T1 has a duration which corresponds to the product of the DATA1 value multiplied by a number of pulses of the first clock 18. Thus, the count establishes the DATA1 value which is thus restituted. It is clear that the restitution of the value is that much easier as the two clocks are timed at the same frequency.

An alteration of the signal due to an electromagnetic disturbance or a filtering of the signal is susceptible to have a slight effect on the duration of the High. On the other hand, this alteration, on some clock impulses only affects very slightly the value of DATA1. The value of the transmitted data is the less affected as the frequency of the timing clocks 18, 28 is higher in comparison to the signal modulation frequency, in this case F1 or F2.

The demodulator can also determine the period of the 1/F1 or 1/F2 signal, and thus the frequency F1 and F2 by counting the number of timing clock pulses which corresponds to a cycle of one High and one Low or T1+T2 or T3+T4. This allows restituting the second DATA2 datum. The count of pulses can then be made between a rising edge and the following rising edge of the pulses.

The DATA1 and DATA2 datum can be routed to an electronic card or a microprocessor of the second piece of equipment 20.

The electronic card, or microprocessor, not shown on FIG. 1, is also susceptible to produce data. This means for example, a third DATA3 datum or information 3 which is to be transmitted from the second piece of equipment 20 towards the first piece of equipment 10. In the example shown, the DATA3 datum is a binary value 1100 which corresponds to a series signal such as represented by FIG. 3. The signal of FIG. 3 presents two Highs, corresponding to the value 1, indicated on the y-axis, followed by two Lows corresponding to the value 0.

The third DATA3 datum is applied, by the intermediary of a synchronization unit 24, to the input of a second modulator 26. The second modulator 26 is part of the second piece of equipment 20.

The signal of FIG. 3, reflecting the DATA3 datum, is applied more precisely to the grid or at the base of a transistor which forms a switch of the second modulator 26.

One can observe, on FIG. 3, that the signal corresponding to the DATA3 datum is synchronized with the transmission signal. It is for example synchronized with a rising edge of the transmission signal, i.e. with a transition from a Low to a High. The synchronization is performed by the synchronization unit 24 timed by the first demodulator 22.

Thus, for a value 1, or a High of the signal of FIG. 3, the transistor is in an open state and the transmission signal is not affected. On the other hand, for a value of 0, the transistor becomes a conductor and connects the transmission line 32 to the ground 35 through the intermediary of a load resistance 23. The load resistance 23, forms with the series resistance 13, mentioned above, a dividing bridge which then attenuates the signal that is present on the transmission line.

The attenuated transmission signal is also present on the input 21 of the first demodulator 22. However, the attenuation affects neither the width nor the duration of the Highs T1 and T3. Nor does it affect the width of the Lows T2, T4. Finally, the attenuation of the transmission signal does not affect its frequency F1, F2 or its period. The attenuation is thus transparent for the first demodulator 22.

According to the state of the second modulator transistor, the transmission signal may present Highs at full voltage, for example the supply voltage Vdc, and Highs at an attenuated voltage. Attenuated voltage is, for example, a voltage equal to Vdc*R2/(R1+R2), where R1 and R2 are, respectively, the values of the series resistance 13 and of the load resistance 23. The Lows, if they correspond to the reference voltage at 0 Volt (ground) are not attenuated. On the other hand, if the voltage of the Lows is not zero, they are also attenuated.

Such a transmission signal is represented in FIG. 4 which indicates the amplitude of the Highs on the vertical axis and time on the horizontal axis. One observes that the signal of FIG. 4 is also modulated in pulse width and in frequency, in the same manner as the signal of FIG. 2 which is without any amplitude modulation.

The transmission line 32 is also connected to an input 51 of a second demodulator 52 of the first piece of equipment 10. The second demodulator presents itself in the form of a threshold comparator.

The threshold comparator preferably presents a threshold between the non-attenuated value of the Highs and the attenuated value of the Highs of the transmission signal. By referring to the example above, the threshold can be set at an intermediary value between Vdc*R2/(R1+R2) and Vdc. The comparator threshold is set by the resistances 53 and 54 which form a dividing bridge between the supply voltage and the ground. It is equal to Vdc*R4/(R3+R4), where R3 and R4 are the resistance values 53 and 54.

The demodulator thus delivers a value 1 when the transmission signal is above the threshold value which corresponds to the non-attenuated Highs, and delivers a value 0 when the transmission signal is below the threshold value, which corresponds to the attenuated Highs, and possibly to the intermediary Lows.

Thus, the demodulator transforms the transmission signal into a signal comparable to that of FIG. 3, from which it is possible to extract the digital DATA3 datum.

The signal corresponds, in the example shown, to two Highs followed by two Lows and indicated a DATA3 value equal to 1100. This value is transmitted to an electronic card or a microcontroller of the first piece of equipment (not shown on FIG. 1).

One can observe in the example described in reference to FIGS. 2 and 4 that the amplitude modulation frequency of the transmission signal is equal to that of the transmission signal. This is due notably to the synchronization mode. The amplitude modulation frequency can also be chosen to be lower than the frequencies of the transmission signal but always synchronized with the latter.

Figure 5:
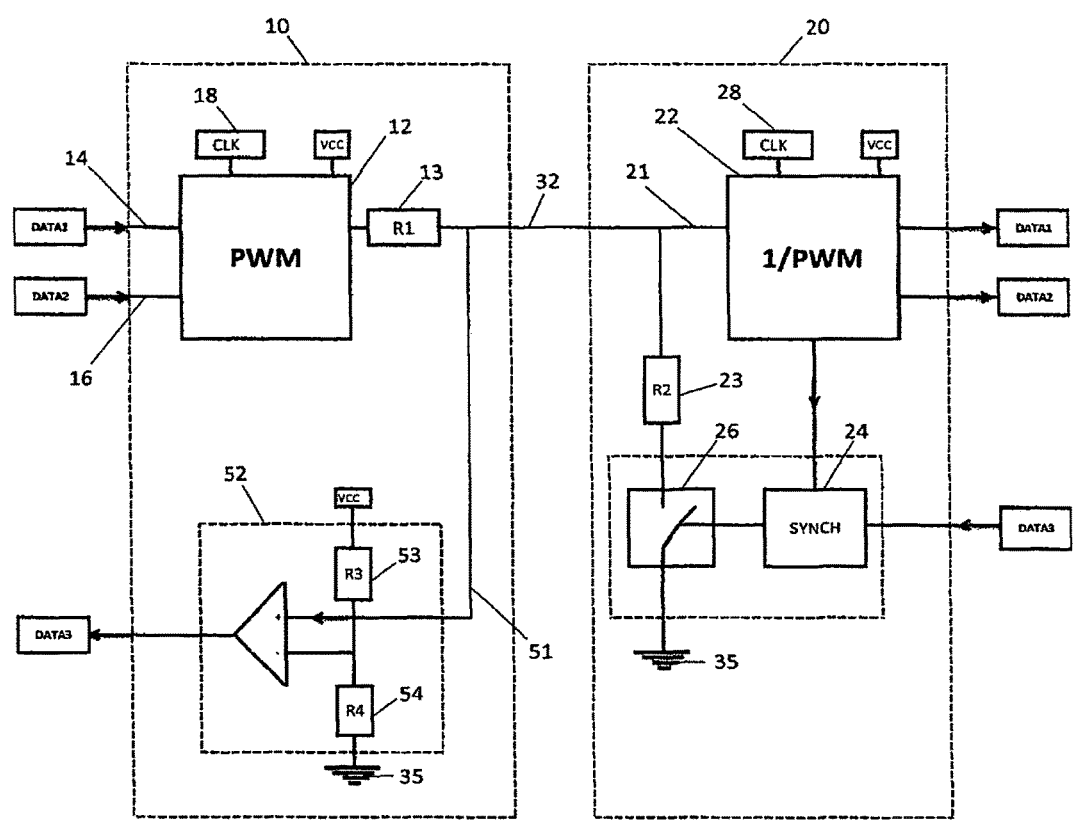
FIG. 5 is a schematic representation of a variant of the communication system of FIG. 1.

FIG. 5 shows another possibility of implementation of the communication system. The system in FIG. 5 presents the same general operation as the system in FIG. 1. Corresponding components are identified with the same reference marks and one can refer to the preceding description as far as they are concerned.

However, and in difference to the system of FIG. 1, the second DATA2 datum is not used to order the selection of a particular frequency for the transmission signal.

On the other hand, the second DATA2 datum is applied to the second input 16 of the first modulator 12. The first DATA1 datum is always applied to the first input 14 of the modulator.

The first modulator 12 uses one of the data, for example DATA1, to order the width, i.e. the duration of a High of a pulse, and uses the other DATA2 datum to order the width, i.e. the duration of the Low of the pulse on the same period of the transmission signal.

The first modulator 12 is timed by a timing clock 18. In this way, the duration of the High or the Low is a multiple of the timing period. For example, and as described earlier, the duration of the High can be T1=DATA1*CLK and the duration of the Low can be T2=DATA2*CLK, i.e. the product of the data to be transmitted multiplied by the CLK value of the timing period.

As an illustration, considering that the values are DATA1=1000 and DATA2=250, and that the frequency of the timing clock is 1 MHz, i.e. with a period of 1, the duration of the High T1 is 1000 µs and the duration of the Low is 250 µs.

FIG. 6 represents a pulse-width modulated signal produced by the first system modulator of FIG. 5. The pulse amplitude is indicated on the y-axis and the time on the x-axis. The signal presents Highs and Lows, their durations being respectively multiples (DATA1, DATA2) of the timing period CLK. The pulses of the first timing clock which set the timing period, are indicated as freely scaled and in the upper part of FIG. 6. It is to be noted that the signal amplitude, for example the amplitude of the Highs does not remain constant to the extent that it is susceptible to be modulated by the second modulator 26 of the second piece of equipment, in the manner described earlier.

More precisely, the transmission signal in FIG. 6 is modulated based on DATA3 datum of binary value 1010 represented in FIG. 7. This value is different from the DATA3 datum represented in FIG. 3. One can observe a synchronization of the modulation based on the DATA3 datum on the rising edges of the transmission signal of FIG. 6. Synchronization on the falling edges would also be possible.

Returning to FIG. 5, one can note that the first demodulator 22, which is part of the second piece of equipment 20, delivers the DATA1 and DATA2 datum from the transmission signal received at its input 21. The data are established by determining respectively the duration of the Highs and of the Lows of the signal of FIG. 6. To do this, the demodulator can be configured to count respectively the number of timing pulses of the second timing clock 28 which separate a rising edge and a falling edge of the transmission signal, or which separate a falling edge from a rising edge of the transmission signal.

As previously indicated, the second timing clock 28 has a frequency with a known ratio to the frequency of the first timing clock 18. Preferably, the two clocks operate on the same frequency.

Figure 8:
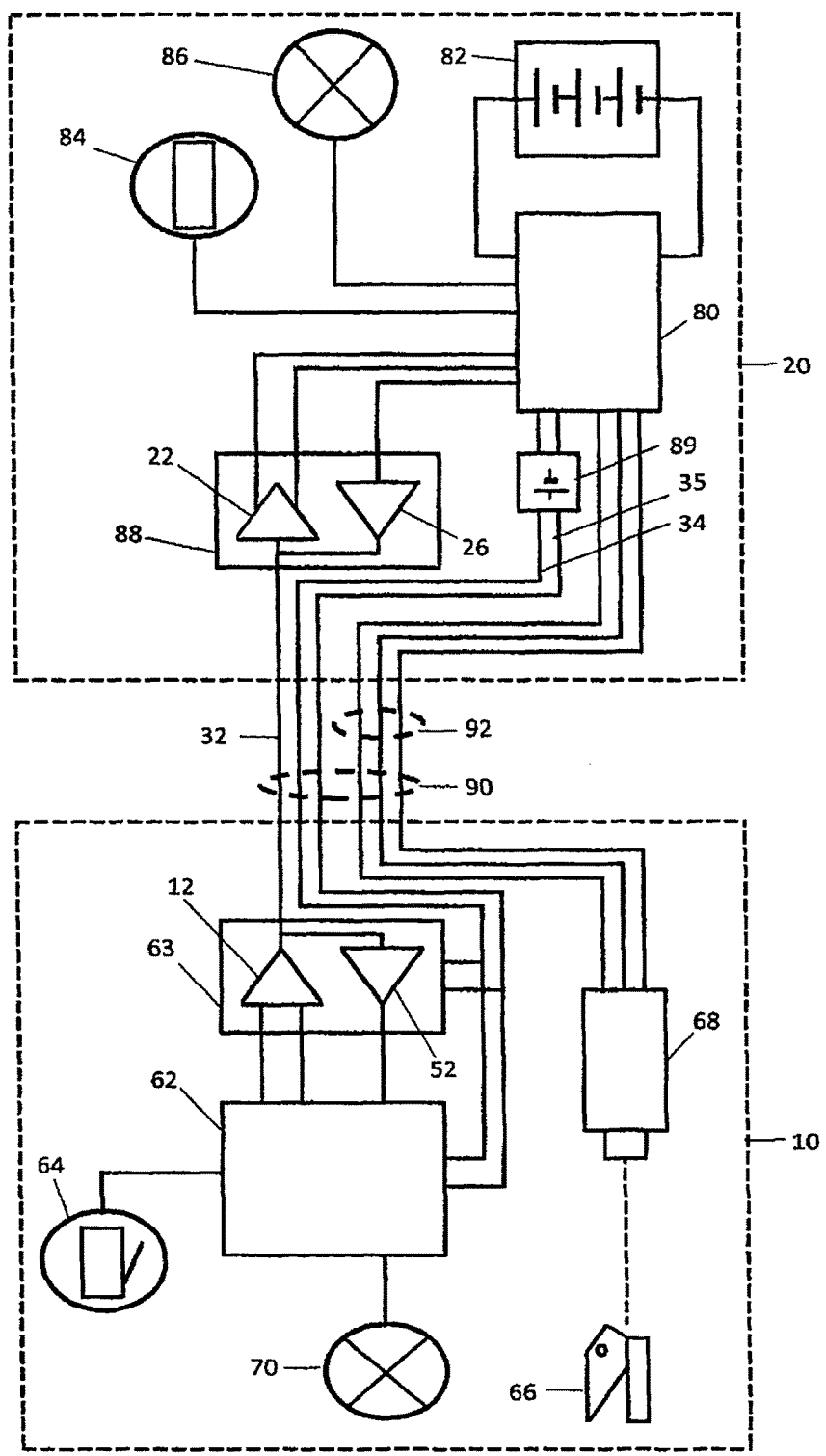
FIG. 8 is a schematic representation of a communication system according to the invention and applied to an electric pruning shear with remote power supply.

FIG. 8 illustrates schematically a particular application of the communication system to an electric pruning shear.

The first piece of equipment 10 is a portable electric pruning shear. It includes a main electronic card 62 connected to a control interface 64, for example a user-operable trigger to control the opening and closing of blades 66. Opening and closing the blades is generally performed by the pivoting of a fixed blade in relation to a mobile blade. The movement of the blade is caused by a motor 68, connected to the mobile blade via a transmission which is not shown. In the example shown, the motor is a brushless three-phase motor.

The electronic card 62 receives the signal from a position sensor of the trigger and establishes control data for opening or closing the blades, and, if applicable, control data for an opening or closing speed. The electronic card 62 can also establish control data for an opening or closing amplitude. These are, for example, DATA1 and DATA2 datum as mentioned previously. These data are supplied to a second electronic card 63 including the first modulator 12 and the second demodulator 52, described previously. It should be noted that a single electronic main card may be provided for all the functions of the cards 62, 63 above.

The pruning shear 10 further includes a warning interface 70, for example one or several light-emitting diodes likely to indicate a power-up, an operating mode, a battery status, a fault situation, etc.

The warning interface 70 is driven by the main electronic card 62 based on the data established by sensors (not shown) of the pruning shear, or based on data supplied by the second demodulator 52 and received from the second piece of equipment 20. These are, for example, the DATA3 datum mentioned earlier.

The second piece of equipment 20 is a remote power supply unit of the pruning shear, likely to being worn on the belt or on the back. It also includes a main electronic card 80. The main function of this card is to establish the controls for electric power for the motor 68 of the pruning shear. The main electronic card 80 of the power supply unit establishes these controls on the basis of control data supplied to it by the first demodulator. These are, for example, DATA1 and DATA2 datum mentioned previously which govern direction, speed or duration of rotation of the motor 68.

The function of the main electronic card 80 is also to provide the current supply for the motor 68 from the energy provided by the main battery 82.

The electronic card 80 can also receive commands from a second control interface 84, dedicated to the power unit. It is, for example, an interface for the control for general Power On, for a command for an operating mode change of the pruning shear. The electronic card 80 uses these controls to drive the motor, or converts them into data intended for the pruning shear. For example, the electronic card can establish data ordering the activation of a light-emitting diode (LED) of the pruning shear to indicate Power On or to indicate a command for wider opening of the blades. The electronic card 80 is for this purpose connected to the second modulator 26. The data transmitted to the pruning shear are, for example, the DATA3 datum mentioned previously.

The electronic card 80 can also drive a warning interface 86 which is also specific to the power supply unit 20. The interface 86 includes, for example, a display, LEDs and/or an audible indicator. The warning interface, for example an audible indicator, can warn the user of the condition of the controls, battery status, operating mode, or any other information relevant to operation, An electronic card 88, distinct from the main electronic card 80, may be provided for the first demodulator 22 and the second modulator 26. These functions may also be integrated into the main electronic card 80.

Reference 89 indicates a secondary accumulator or battery which may or may not be distinct from the main battery 82, and which is intended to supply power to the electronic cards, interfaces and various components of the pruning shear 10 and the power supply unit 20.

A cable 90 connects the first piece of equipment 10, i.e. the pruning shear, to the second piece of equipment 20, i.e. the power supply unit. The cable is preferably connected to the first and the second piece of equipment by connectors which are not shown. It is a multi-conductor cable which includes several connecting wires.

In the example shown, the cable 90 includes a conductor wire which forms the transmission line 32 of the signals already mentioned. It also includes three conductor wires 92 connecting the main electronic card 80 to the motor 68 for supplying the motor with three-phase current. Finally, the cable includes two conductor wires which provide the supply voltage to the electronic card of the pruning shears, for example 5 Volt. These are the wires 34, 35 mentioned in reference to FIG. 1 which constitute the ground potential and the DC potential.

The invention claimed is:

1. Bi-directional communication system between a first piece of equipment and a second piece of equipment connected to the first piece of equipment by means of a single-conductor transmission line including means of data (DATA1, DATA2) transmission from the first piece of equipment towards the second piece of equipment by pulse-width modulation of a transmission signal emitted on the transmission line, and means of data (DATA3) transmission from the second piece of equipment towards the first piece of equipment by amplitude modulation of said transmission signal in which the means of data transmission from the first piece of equipment towards the second piece of equipment feature a first modulator capable of generating the transmission signal modulated in pulse-width, based on at least one first digital datum (DATA1, DATA2), the first modulator being located in the first piece of equipment, characterized in that the first modulator is capable of coding a first digital datum (DATA1) by width modulation of either a High (T1) or a Low (T2) of the transmission signal, and of coding a second digital datum (DATA2) by modulation of a period, or a frequency, of the transmission signal respectively.

2. System according to claim 1 in which the means of transmission include furthermore a first demodulator capable of extracting said digital data (DATA1, DATA2) from the transmission signal, with the demodulator being located in the second piece of equipment.

3. System according to claim 1 in which the first modulator is capable of coding the first digital data (DATA1) by width modulation of a High (T1) of the transmission signal and of coding a second digital datum (DATA2) by width modulation of a Low (T2) of the signal of transmission.

4. System according to claim 1, in which the means of data transmission from the second piece of equipment towards the first piece of equipment feature a second modulator, capable of modifying the amplitude of the transmission signal based on a third digital datum (DATA3), the second modulator being located in the second piece of equipment, the means of transmission further including a second demodulator for extracting said third digital datum (DATA3) from the transmission signal, the second demodulator being located in the first piece of equipment.

5. System according to claim 4, in which the second modulator includes a load resistance of the transmission line in series with a control transistor forming a switch and driven on the basis of the third digital datum.

6. System according to claim 1, in which the transmission signal presents a frequency higher or equal to an amplitude modulation frequency of the transmission signal.

7. System according to claim 1, including a synchronization unit for synchronizing the amplitude modulation of the transmission signal with the transmission signal.

8. System according to claim 1, in which the first piece of equipment is either a tool with an electric motor or a remote power supply unit associated to the tool, and the second piece of equipment is the other of either the power tool or the remote power supply unit associated with the tool.

9. System according to claim 8, in which the first piece of equipment is a portable power tool chosen among a pruning shear, hand shears, a chain saw, a hedge trimmer, a leaf blower and a brush cutter, and in which the second piece of equipment is a remote electric power supply unit connected to the tool by a cable with multiple conductors, the cable including a conductor forming the transmission line.

10. System according to claim 9 in which the tool presents a first control interface connected to the first modulator to transmit control data to the power supply unit and in which the power supply unit includes an electronic card connected to the first demodulator to receive the control data, the electronic card being configured to control at least a supply current for the electric motor based on the control data, the card being furthermore connected to the motor by the multi-conductor cable for supplying the motor with the power supply current.

11. System according to claim 10, used to transmit at least either the data corresponding to an action on the first control interface of the tool or data corresponding to an action on a second control interface of the power supply unit.

12. System according to claim 9, in which the multi-conductor cable further includes two wires for the power supply of at least one electronic card of the first piece of equipment.

13. System according to claim 9, in which the multi-conductor cable further includes three conductor wires for the current supply of the motor.

14. System according to claim 11, for the exchange of signals between a pruning shear and a power supply unit of the pruning shear, in which the first interface is configured for the entry of at least either a command for movement amplitude of a blade of the pruning shear or a command for movement direction of the blade, and in which the second interface is configured for the entry of at least either a command for Power ON or a command for changing the operating mode of the pruning shear.

15. Method of communication between a first piece of equipment and a second piece of equipment connected to the first piece of equipment by a single-conductor transmission line in which data (DATA1, DATA2) are transmitted from the first piece of equipment towards the second piece of equipment by pulse-width modulation of a transmission signal emitted on the transmission line, and in which are transmitted data from the second piece of equipment towards the first piece of equipment by amplitude modulation of said transmission signal and in which are also transmitted data (DATA2) from the first piece of equipment towards the second piece of equipment by frequency modulation of the transmission signal.

16. System according to claim 6, in which the transmission signal is higher than 10 times the amplitude modulation frequency.

* * * * *